(12) United States Patent
Huibregtse et al.

(10) Patent No.: US 8,381,885 B2
(45) Date of Patent: Feb. 26, 2013

(54) BRAKE SYSTEM AND LAWN MOWER IMPLEMENTING THE SAME

(75) Inventors: Mark Huibregtse, Cleveland, WI (US); Nathaniel J. Vlietstra, Elkhart Lake, WI (US)

(73) Assignee: Kohler Co.

( * ) Notice: Subject to any disclaimer, the term of this patent is extended or adjusted under 35 U.S.C. 154(b) by 380 days.

(21) Appl. No.: 12/696,352

(22) Filed: Jan. 29, 2010

(65) Prior Publication Data

US 2011/0143883 A1 Jun. 16, 2011

Related U.S. Application Data

(60) Provisional application No. 61/286,238, filed on Dec. 14, 2009.

(51) Int. Cl.
*B60T 13/04* (2006.01)
(52) U.S. Cl. .......... 188/166; 56/11.3; 477/185; 188/156
(58) Field of Classification Search ............. 477/185, 477/200, 204; 56/10.5, 11.3; 188/156, 158, 188/159, 166
See application file for complete search history.

(56) References Cited

U.S. PATENT DOCUMENTS

| | | | |
|---|---|---|---|
| 1,951,189 A | 3/1934 | Fogarty | |
| 3,228,177 A | 1/1966 | Coates | |
| 3,955,653 A | 5/1976 | Comer | |
| 4,035,994 A * | 7/1977 | Hoff ............................... | 56/11.3 |
| 4,394,893 A | 7/1983 | Kronich et al. | |
| 4,458,472 A | 7/1984 | Christopherson | |
| 4,531,487 A | 7/1985 | Fujikawa et al. | |
| 4,757,885 A | 7/1988 | Kronich | |
| 4,889,213 A * | 12/1989 | Roller ........................... | 477/204 |
| 4,979,596 A | 12/1990 | Roller | |
| 5,040,644 A | 8/1991 | Turczyn et al. | |
| 5,086,890 A * | 2/1992 | Turczyn et al. ............... | 477/204 |
| 5,224,448 A | 7/1993 | Kandler | |
| 5,289,903 A * | 3/1994 | Nagai et al. ................... | 188/71.7 |
| 5,641,444 A * | 6/1997 | Fujikawa et al. ............. | 264/141 |
| 5,784,868 A | 7/1998 | Wadzinski et al. | |
| 6,095,294 A | 8/2000 | McGourthy, Sr. et al. | |

(Continued)

FOREIGN PATENT DOCUMENTS

FR 2679970 2/1993

OTHER PUBLICATIONS

Seven Pages of International Preliminary Report on Patentability from PCT/US2010/058473, a counterpart PCT application, dated Jun. 19, 2012.

(Continued)

*Primary Examiner* — Justin Holmes
*Assistant Examiner* — Stacey Fluhart
(74) *Attorney, Agent, or Firm* — The Belles Group, P.C.

(57) ABSTRACT

A brake system and powered implement, such as a lawn mower, incorporating the same. In one aspect the invention is a system for stopping an electrically grounded rotating member of an engine powered by an ignition circuit, the system comprising: a conductive member operably coupled to the ignition circuit that renders the engine inoperative when electrically grounded, the conductive member mounted adjacent the rotating member; and the conductive member normally biased into a brake position in which the conductive member contacts the rotating member and is electrically grounded as a result of the contact with the rotating member.

22 Claims, 13 Drawing Sheets

U.S. PATENT DOCUMENTS

| | | |
|---|---|---|
| 6,983,583 B2 | 1/2006 | Bucher |
| 7,003,936 B1 | 2/2006 | Yue et al. |
| 7,076,348 B2 | 7/2006 | Bucher et al. |
| 7,293,397 B2 | 11/2007 | Osborne |
| 7,600,363 B2 | 10/2009 | Porter et al. |
| 2002/0056348 A1 | 5/2002 | Gass et al. |
| 2007/0125587 A1 | 6/2007 | Tate et al. |
| 2008/0036241 A1* | 2/2008 | Aisenbrey ............... 296/187.01 |

OTHER PUBLICATIONS

Four Pages of International Search Report from PCT/US2010/058473, a counterpart PCT application, dated Feb. 15, 2012.

* cited by examiner

BRAKE SYSTEM AND LAWN MOWER IMPLEMENTING THE SAME

CROSS-REFERENCE TO RELATED APPLICATIONS

The present application claims the benefit of U.S. Patent Provisional Patent Application Ser. No. 61/286,238, filed Dec. 14, 2009, the entirety of which is hereby incorporated by reference.

FIELD OF THE INVENTION

The present invention relates generally to the field of lawn mowers and other engine powered implements, and specifically to brake systems particularly suited for lawn mowers and other engine powered implements.

BACKGROUND OF THE INVENTION

Brake systems for automatically shutting down the engine and/or stopping the rotating blade of a lawnmower or other powered implement when the operator is not using the lawn mower or other powered implement are known in the art. These brake systems have come to be known as "deadman" brake systems.

Existing deadman brake systems typically consist of two parts, a positive braking mechanism disposed within the engine, and a lever disposed at the upper handle portion of the lawn mower. The lever is connected by a cable to the braking mechanism for actuating the braking mechanism. The braking mechanism is normally biased into a position such that the braking mechanism engages the flywheel, thereby preventing or stopping rotation of the crankshaft. Opposite biasing, and thus disengagement of the braking mechanism from the flywheel, is accomplished when the operator actuates and holds the lever against the upper handle portion. In order to keep the engine running, the lever must remain biased by the operator. Once the lever is released, the natural bias of the system moves the braking mechanism back into engagement with the flywheel, thereby stopping the engine.

It is also known in the prior art to include an ignition kill switch with the deadman brake system. In existing arrangements, when the brake mechanism is in its braking position, the kill switch connects the ignition circuit to ground, grounding or shorting out the primary coil of the ignition transformer so that no current will flow into the primary coil, thereby bypassing and preventing the spark plug from firing.

In existing systems, the grounding of the ignition circuit is accomplished by contacting the kill switch (or kill scraper) with the mechanical brake arm that engages the brake pad. This arrangement suffers from a number of deficiencies, including: (1) the use of many components and complex bends to perform the required function; and (2) increased space requirements as the mechanical brake arm in these systems require a greater degree of travel because the arm must accomplish both tasks of operating the brake and contacting and engaging the switch. Furthermore, by nature of the location of the kill switch near the cutting blade of the lawn mower, there is an increased possibility that the terminals of the kill switch can be become covered with debris that could prevent and/or delay the grounding of the ignition circuit. Thus, a need exists for an improved and simplified deadman brake system and engine powered implement incorporating the same.

SUMMARY OF THE INVENTION

These and other needs are solved by the present invention which uses contact with a rotating member of the engine to ground a conductive member of the ignition circuit that renders the engine inoperable.

In one embodiment, the invention can be a powered implement having an engine comprising: a rotating member rotated by the engine, the rotating member being electrically ground; an ignition circuit that powers the engine, the ignition circuit operably coupled to a conductive member that renders the engine inoperative when electrically grounded; a brake system comprising an actuator, the conductive member normally biased into a brake position in which the conductive member contacts the rotating member and is electrically grounded as a result of the contact with the rotating member; and the actuator operably coupled to the conductive member so that actuation of the actuator moves the conductive member from the brake position to an operating position in which the conductive member is spaced-apart from the rotating member and is in an electrically non-grounded state.

In another embodiment, the invention can be a system for stopping an electrically grounded rotating member of an engine powered by an ignition circuit, the system comprising: a conductive member operably coupled to the ignition circuit that renders the engine inoperative when electrically grounded, the conductive member mounted adjacent the rotating member; and the conductive member normally biased into a brake position in which the conductive member contacts the rotating member and is electrically grounded as a result of the contact with the rotating member.

In yet another aspect, the invention can be a brake system for stopping an electrically grounded rotating member of an engine powered by an ignition circuit, the brake system comprising: an electrically conductive brake pad operably coupled to the ignition circuit that renders the engine inoperative when electrically grounded.

In still another embodiment, the invention can be a method of stopping a rotating member of an engine powered by an ignition circuit, the method comprising: electrically connecting a conductive member to the ignition circuit so that electrical grounding of the conductive member renders the engine inoperative; and contacting the rotating member with the conductive member, the rotating member being electrically grounded; wherein the contact between conductive member and the rotating member electrically grounds the conductive member, thereby rendering the engine inoperative.

It is preferred, in certain embodiments, that the powered implement take the form of a lawn mower, a snow blower, a tractor or a powered garden tool, such as a tiller.

DETAILED DESCRIPTION OF THE DRAWINGS

Figure 1:
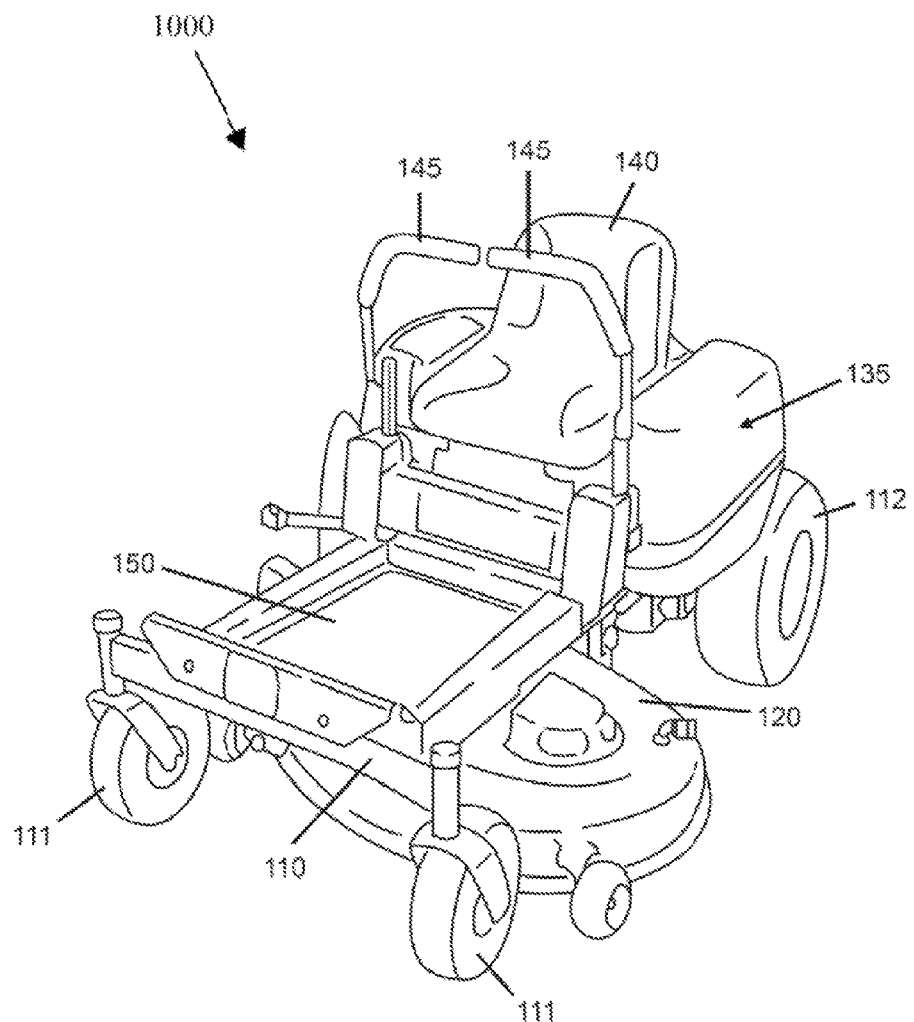
FIG. 1 is an isometric view of a riding lawn mower according to an embodiment of the present invention.

Referring first to FIG. 1, a powered implement, in the form of a riding lawn mower 1000, is illustrated according to one embodiment of the present invention. The riding lawn mower 1000 incorporates an embodiment of the inventive brake system as discussed below. However, while the invention is described with reference to a lawn mower, the invention is not so limited. In other embodiments, the invention can take the form of and/or be incorporated into a wide variety of powered implements in which automatic shut down of the engine upon the operator failing to effectuate and/or maintain a certain condition is desired. Examples of such powered implements include without limitation: a snow thrower; a utility tractor; a construction implement; a golf cart; a garden implement; a landscaping implement; a tiller; a trimmer; a weeder; a mulcher; and combinations thereof. The invention is applicable to both riding powered implements and ambulatory powered implements, and can be scaled for home, commercial and/or industrial applications.

The lawn mower 1000 generally includes a chassis 110, front wheels 111 and rear wheels 112 supporting the chassis 110, a mower deck 120 supported by the chassis 110, an engine 200 (schematically illustrated in FIGS. 2A-2B) supported by the chassis 110, a cutting implement 125 (schematically illustrated in FIGS. 2A-2B) disposed beneath the mower deck 120 and rotationally driven by the engine 200, a foot rest 150 supported by the chassis 110, and a seat 140 supported by the chassis 110 for an operator to sit in. The seat 140 also serves as an actuator for the inventive brake system, the structure and function of which will be discussed in detail below. The engine 200 is housed within the engine compartment 135.

In the illustrated construction, the lawnmower 1000 is a zero turn radius mower having a pair of control levers 145 for the independent forward and reverse operation of the front and/or rear wheels 111, 112. The invention, however, is not limited to any specific type of lawnmower and may be embodied in any other type of riding or ambulatory lawn mower, such as the ambulatory lawn mower 2000 depicted in FIG. 9.

Figure 2A:
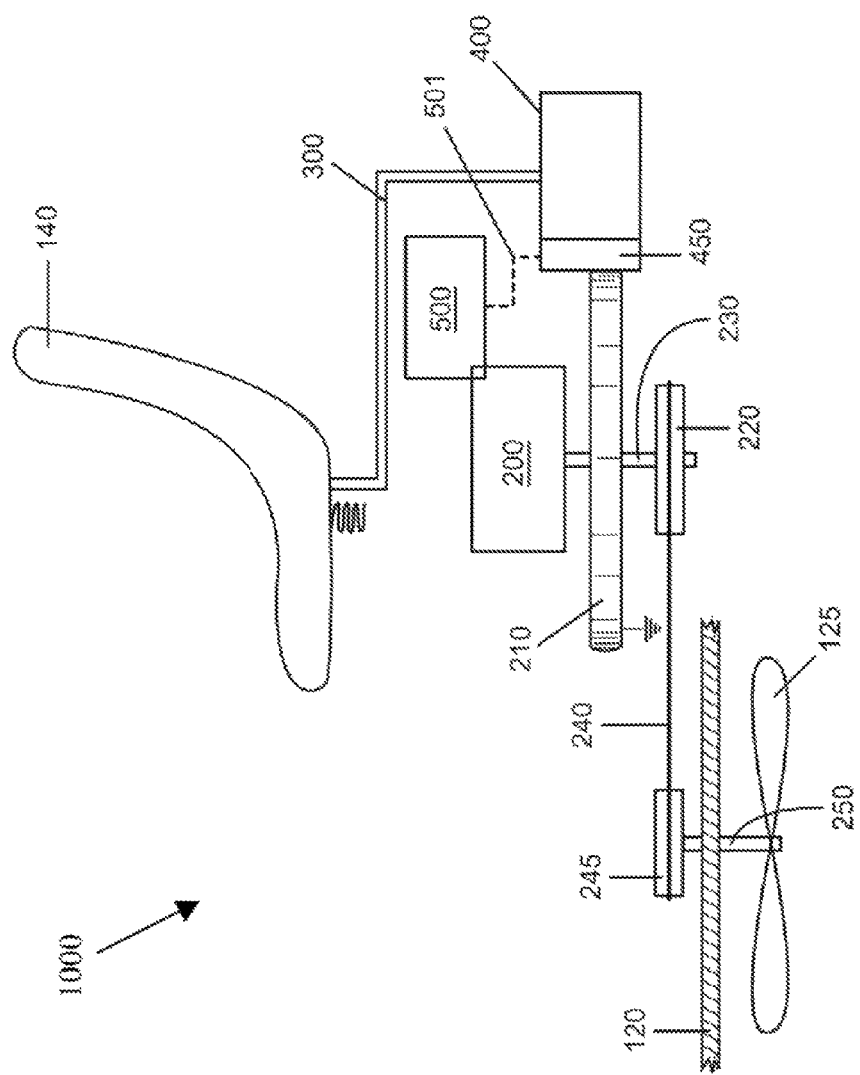
FIG. 2A is an electromechanical schematic of the braking system of the riding lawn mower of FIG. 1 according to an embodiment of the present invention, wherein the braking system is in a brake position.
Figure 2B:
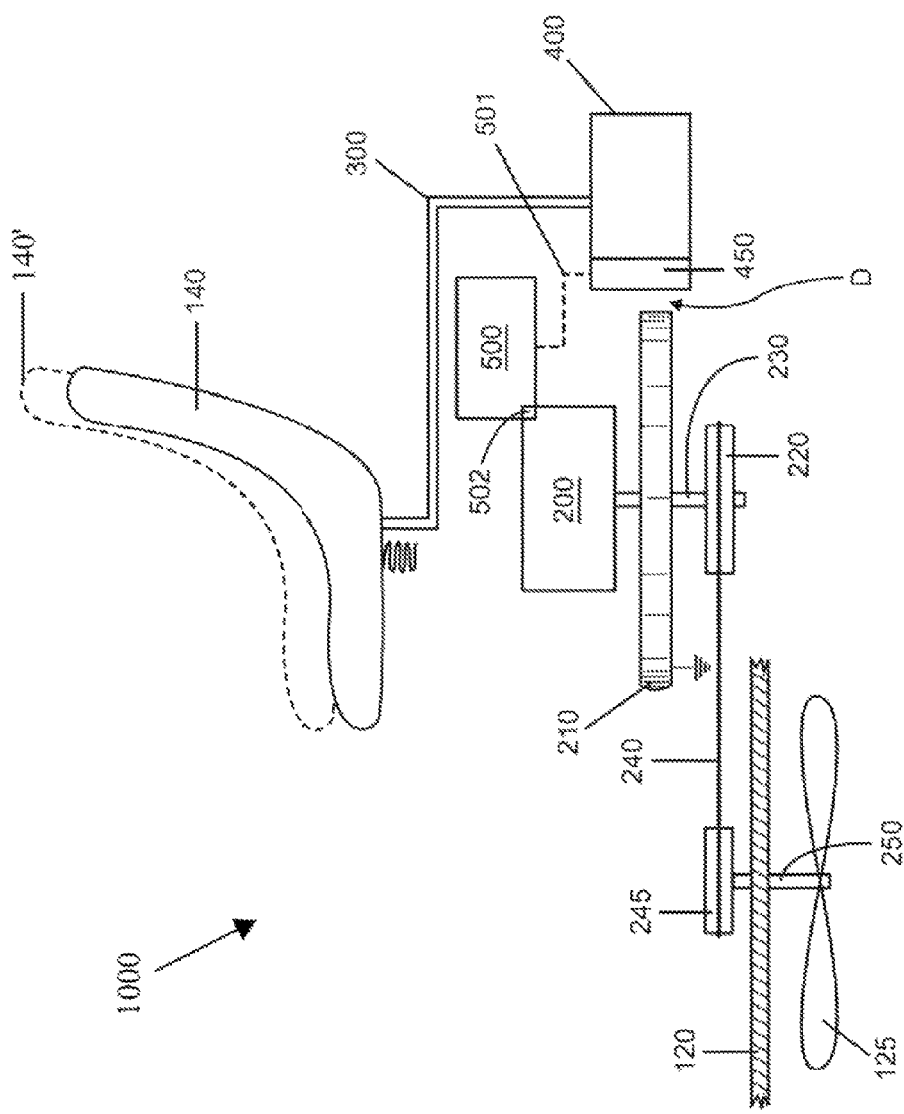
FIG. 2B is an electromechanical schematic of the braking system of FIG. 2A, wherein the braking system has been actuated into an operating position.

Referring now to FIGS. 2A and 2B concurrently, the inventive brake system is illustrated incorporated into the lawn mower 1000 of FIG. 1. The lawn mower 1000 comprises an engine 200, which in the exemplified embodiment is an internal combustion engine. The invention, however, is not limited by the type of engine used and in other embodiments the engine 200 may be an electric engine, a pneumatic engine, an electromagnetic engine, or a hybrid engine. The engine 200 rotationally drives a flywheel 210 and a drive pulley 220 via a crankshaft 230. The flywheel 210 and the drive pulley 220 are connected directly to the crankshaft 230 but could be coupled indirectly to the crankshaft 230 or located at other positions along the crankshaft 230 if desired. The flywheel 210 is constructed of an electrically conductive material, such as a metal or other suitably rigid conductive material, and serves as an electrical ground. The flywheel 210 can be sufficiently massive to serve as the ground itself or may be electrically grounded through its connection to the crankshaft 230 or through coupling to the chassis 110 or engine block through the use of an appropriately designed electrical connector.

A drive belt 240 is provided that operably couples the drive pulley 220 to the cutter pulley 245. The drive belt 240 transmits the rotational motion of the drive pulley 220 to the cutter pulley 245. The cutter pulley 245 is connected to and rotationally drives the cutter shaft 250, which in turn is connected to and rotationally drives the cutting implement 125 (which is located below the mower deck 120). The cutting implement 125 can be one or more lawn mower cutting blades. While not illustrated, the crankshaft 230 of the engine 200 is also used to rotationally drive the rear and/or front wheels 111, 112, through mechanical coupling arrangements that are well known in the art.

The exact stricture and layout of the system described above for rotationally driving the wheels 111, 112 and the cutting implement 125 is not to be considered limiting of the present invention and can take on a wide variety of embodiments and arrangements. For example, the flywheel 210 can be adapted to function as the pulley that drives the drive belt 240. Furthermore, in certain embodiments, the cutting implement 125 may be connected directly to the crankshaft 230 (such as the example shown in FIGS. 9-10B), thereby eliminating the need for many of the components illustrated in FIGS. 2A and 2B.

Turning now to the inventive brake system, the brake system generally comprises an actuator (which is the form of the seat 140), a linkage member 300, and a brake assembly 400. The brake assembly 400 comprises a conductive member 450. The conductive member 450 is operably coupled to the ignition kill lead of an ignition circuit 500 by a hardwire connection 501 so that electrically grounding the conductive member 450 renders the engine 200 inoperative.

In FIG. 2A, the brake system is in a brake position in which the conductive member 450 is in contact with and engages the flywheel 210. As a result of the contact between the flywheel 210 and the conductive member 450 when in the brake position, the conductive member 450 is electrically grounded, thereby rendering the engine 200 inoperative (i.e., shutting down and/or maintaining the engine 200 in an inoperative state). As discussed in greater detail below, the brake assembly 400 is designed to normally bias the conductive member 450 into the brake position.

In FIG. 2B, the brake system is in an operating position in which the conductive member 450 is spaced apart from the flywheel 210 by a distance D and is in an electrically non-grounded state. As discussed in greater detail below, the operator must actuate the actuator (which is in the form of the seat 140) to overcome the normal biasing of the conductive member 450 into the brake position and move the conductive member 450 into the operating position. As a result of the conductive member 450 being spaced apart from the flywheel 210 and in the electrically non-grounded state when in the operating position, the ignition circuit 500 is fully functional, thereby facilitating normal operation of the engine 200.

The seat/actuator 140 is operably coupled, either directly or indirectly, to the brake assembly 400 by the linkage member 300 so that actuation of the seat 140 moves the brake assembly 400 from the brake position (illustrated in FIG. 2A) to the operating position (illustrated in FIG. 2B). Actuation of the seat 140 occurs when force is applied to the seat 140 by the user sitting in the seat 140, thereby moving the seat 140 from a non-actuated position (FIG. 2A) to an actuated position (FIG. 2B). The movement/actuation of the seat 140 is transmitted to the brake assembly 400 by the linkage member 300. The movement/actuation of the seat 140 is schematically illustrated in FIG. 2B wherein the dotted line of the seat 140' indicates non-actuated position of the seat 140 relative to its actuated position, shown in solid line.

Because the brake assembly 400 normally biases the conductive member 450 into the brake position (i.e., into contact with the flywheel 210), the conductive member 450 is automatically moved from the operating position (FIG. 2B) to the brake position (FIG. 2A) upon the operator failing to provide the necessary force to keep the actuator/seat 140 in the actuated position. The normal biasing of the conductive member 450 into the brake position by the brake assembly 400 also normally biases the actuator/seat 140 into the non-actuated position. Thus, the movement of the actuator/seat 140 and the conductive member 450 is linked so that movement of the actuator/seat 140 from the non-actuated position to the actuated position corresponds with movement of the conductive member 450 from the brake position to the operating position, and vice versa. This correspondence in movement is achieved by the linkage member 300.

The linkage member 300 can be a mechanical, electrical (wired or wireless) or electromechanical linkage. For example, the linkage member 300 can be a multi-bar linkage, a single-bar linkage, a cable, a switch, a sensor, or combinations thereof. It may be preferred in certain embodiments that the linkage member 300 be a mechanical linkage in order to eliminate the possibility of electronic failure.

Additionally, while the actuator is exemplified as a seat 140, the invention is not so limited and the actuator can take on a wide variety of structural embodiments. Examples, include without limitation, levers, foot pedals, plungers, buttons, or any other structural arrangement capable of being actuated by the operator.

Figure 8:
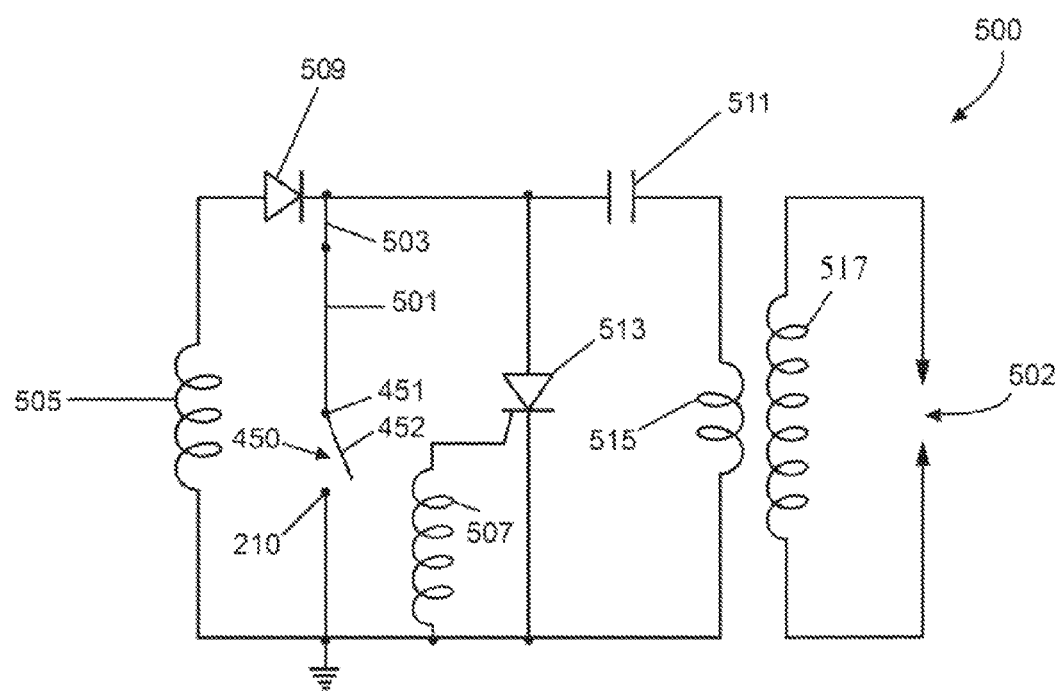
FIG. 8 is an electrical schematic of a portion of an ignition circuit according to an embodiment of the present invention.

As mentioned above, the conductive member 450 of the brake assembly 400 is operably coupled to the ignition circuit 500 so that electrically grounding the conductive member 450 renders the engine 200 inoperative. The operable coupling is achieved by a hardwired electrical connection 501 connected at one end to the ignition circuit 500 and at the other end to the conductive member 450. More specifically, the conductive member 450 is operably coupled to the ignition kill lead of the ignition circuit 500 by the wire 501 so that electrically grounding of the conductive member 450 shorts the ignition circuit 500, thereby preventing a spark plug 502 from firing and operating the engine 400. An example of the relevant portion of the ignition circuit 500 and its connection to the conductive member 450 is illustrated in FIG. 8.

In the exemplified embodiment, the conductive member 450 of the inventive brake system is exemplified as being moved into and out of contact with the flywheel 210 to achieve the electrically grounded and non-grounded states that disable and enable operability of the engine 200 respectively. The invention, however, is not so limited and the electrical grounding of the conductive member 450 can be achieved by contact with a wide variety of members that are rotationally driven by the engine 200 so long as they are electrically ground, including without limitation, the crankshaft 230, the pulleys 220, 245 and the cutter shaft 250. Furthermore, while the conductive member 230 is exemplified as contacting an outer peripheral surface of the flywheel 210, the brake assembly 400 can be positioned and/or altered so that the conductive member 450 contacts the top planar surface, the bottom planar surface and/or an inner peripheral surface of the flywheel 210.

The conductive member 450 is preferably an electrically conductive brake pad, which will be exemplified in detail with respect to FIGS. 3-6. The invention, however, is not so limited and the conductive member 450 can take on a wide variety of structural forms and arrangements, so long as they are capable of carrying an electrical current from the ignition kill lead when electrically grounded to the flywheel 210 (or other member rotational driven by the engine 200) and are in an electrically non-grounded state when not in contact with the flywheel 210 (or other member rotational driven by the engine 200). For example, the conductive member 450 can be a mere body or protuberance constructed of an electrically conductive material that extends from a brake arm or other movable member. It is not necessary that the conductive member 450 provide the primary frictional force that stops and/or retards rotation of the flywheel 210 (or other member rotational driven by the engine 200) in all embodiments, although this may be preferred in certain embodiments.

Figure 3:
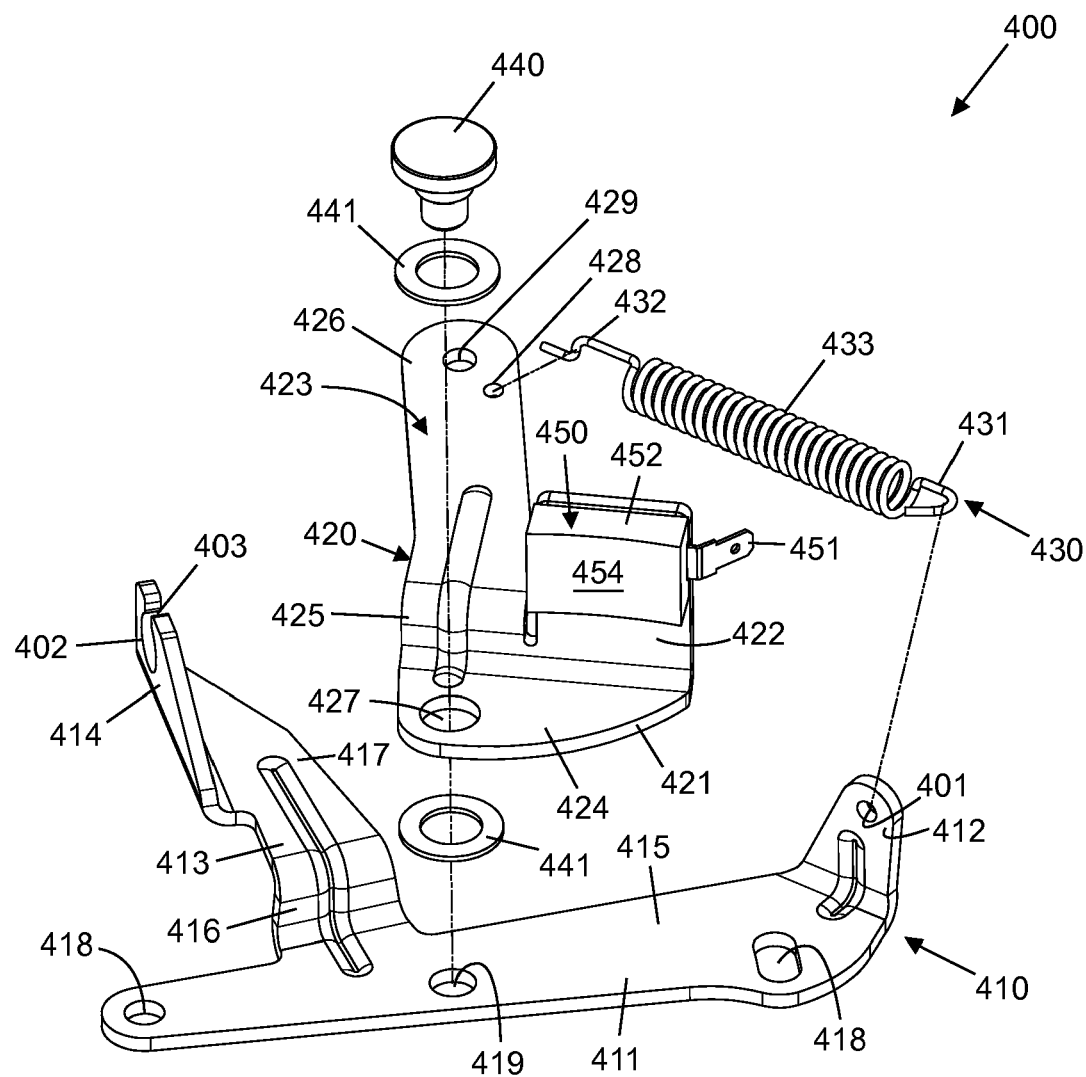
FIG. 3 is an isometric view of a structural embodiment of the brake assembly of the braking system of FIGS. 2A-2B according to an embodiment of the present invention.

Referring now to FIG. 3, an exemplary structural embodiment of the brake assembly 400 is illustrated in an exploded state. For ease and completeness of discussion, the individual components of the brake assembly 400 will now be described in detail with reference to FIG. 3. The assembled state of the brake assembly will be described thereafter with reference to FIG. 4.

The brake assembly 400 generally comprises a base plate 410, a brake arm 420, a coil spring 430 and an electrically conductive brake pad 450 (which is the exemplified structural embodiment of the conductive member from FIGS. 2A-2B). The base plate 410 and the brake arm 420 are constructed of a material capable of handling the loads experienced by the braking system in which they are incorporated. Suitable materials may include, without limitation, metals, plastics, ceramics, composite materials, and combinations thereof. The exact material of construction and dimensions of the base plate 410 and the brake arm 420 will be selected on a product design basis. In one embodiment, the base plate 410 and the brake arm 420 are preferably constructed of carbon steel with a zinc chromate coating.

The brake pad 450 is constructed of an electrically conductive material, and preferably of an electrically conductive material capable of producing sufficient friction force between the brake pad 450 and the flywheel 210 to perform the required braking function. In one embodiment, the electrically conductive friction material is a resin composite material containing interlocking steel fibers. The invention, however, is not so limited and other electrically conductive materials may be used, including without limitation electrically conductive ceramics, metals, electrically conductive metal matrix composite materials, and combinations thereof.

The base plate 410 comprises a mounting plate 411, a spring connection plate 412, an arm plate 413, and a grommet mounting plate 414. The spring connection plate 412 extends from an upper surface 415 of the mounting plate 411 in a substantially normal direction. The arm plate 413 has a first section 416 that extends from the upper surface 415 of the mounting plate 411 in the substantially normal direction and a second section 417 that extends substantially parallel with and away from the mounting plate 411. The grommet mounting plate 414 extends from a distal end of the second section 417 of the arm plate 413 in a direction substantially normal to the front surface 415 of the mounting plate 415. The mounting plate 411, the spring connection plate 412, the arm plate 413, and the grommet mounting plate 414 are preferably formed as an integral and unitary construct, collectively forming the base plate 410. Of course, the base plate 410 can be constructed as a multi-piece structure using known connection techniques, including welding, bolting, clamping, adhesion, etc.

The mounting plate 411 of the base plate 410 comprises a brake arm mounting hole 419 that is used to pivotably mount the brake arm 420 to the base plate 410. Fastener holes 418 are also provided in the mounting plate 411 of the base plate 410 for fixedly mounting the base plate 410 adjacent the flywheel 210 (or other rotating member) of the lawn mower 1000 with bolts and/or other fasteners using techniques known in the art. Depending on the type and structure of the powered implement in which the braking assembly 400 is to be used, the base plate 410 may be mounted to the chassis, the mower deck, a bulkhead, or other stable structure of the powered implement. The fastener hole 418 near the spring connection plate 412 is an elongated non-circular shape to allow fine adjustment of the positioning and orientation of the brake assembly 400 during installation and/or repair.

The spring connection plate 412 comprises a spring hole 401 for receiving a first end 431 of the coil spring 430. The grommet mounting plate 414 similarly comprises an open perimeter hole 402 in which a grommet 310 of a cable sleeve/sheath 320 (FIG. 7A) can be fixedly mounted. The open perimeter hole 402 comprises a reduced width slot 403 that forms a passageway into the open perimeter hole 402 through which the grommet 310 can be slid during mounting.

While a preferred embodiment of the base plate 410 has been exemplified and described, it is to be understood that the base plate 410 can take on a wide range of structural arrangements that may omit, alter, rearrange and/or combine one or more of the mounting plate 411, the spring connection plate 412, the arm plate 413, and the grommet mounting plate 414.

The brake arm 420 comprises a mounting plate 421, a brake pad plate 422 and an arm plate 423. The brake pad plate 422 extends from an upper surface 424 of the mounting plate 421 in a substantially normal direction. The arm plate 423 has a first section 425 that extends from the upper surface 424 of the mounting plate 421 in the substantially normal direction and a second section 426 that extends substantially parallel with and away from the mounting plate 421. The mounting plate 421, the brake pad plate 422, and the arm plate 423 are preferably formed as an integral and unitary construct, collectively forming the brake arm 420. Of course, the brake arm 420 can be constructed as a multi-piece structure using known connection techniques, including welding, bolting, clamping, adhesion, etc.

The mounting plate 421 of the brake arm 420 also comprises a brake arm mounting hole 427 that is used to pivotably mount the brake arm 420 to the base plate 410. The arm plate 423 comprises a spring hole 428 for receiving a second end 432 of the coil spring 430. The arm plate 423 also comprises a linkage hole 429 to which an end of a cable 330 (FIG. 7A) is connected.

The coil spring 430 comprises a helical body 433, a first end 431, and a second end 432. The ends 431, 432 of the coil spring 430 are configured for connection to the base plate 410 and the brake arm 420 respectively. The first end 431 of the coil spring 430 is a hook member that is connected to the base plate 410 via the spring hole 401. The second end 432 of the coil spring 430 has tortuous shape and is connected to the brake arm 420 via the spring hole 428. While a coil spring 430 is exemplified as the resilient member used to normally bias the brake arm 420 into the brake position (discussed in greater detail below), other types of resilient members can be used in place of or in conjunction with the coil spring 430, including without limitation, any type of tension/extension spring, compression spring or torsional spring. Specific examples may include, without limitation, cantilever springs, helical springs, volute springs, balance springs, leaf springs, v-springs, Belleville springs, constant-force springs, gas springs, mainsprings, rubber bands, torsion springs, negator springs, and wave springs.

The brake pad 450 includes an electrically conductive terminal 451 extending from a main brake pad body 452. The brake pad 450 is fixedly mounted to the brake pad plate 422 of the brake arm 420. The mounting and connection of the brake pad 450 to the brake arm 420 will be discussed in greater detail below with respect to FIGS. 5-6.

The brake assembly 400 also comprises a peg 440 and washers 441 that are used to pivotably mount the brake arm 420 to the base plate 410. The peg 440 extends through the brake arm mounting hole 427 of the brake arm 420 and the brake arm mounting hole 419 of the base plate 410. Of course, the pivotable mounting of the brake arm 420 to the base plate 410 can be accomplished using a variety of structural arrangement.

Figure 4:
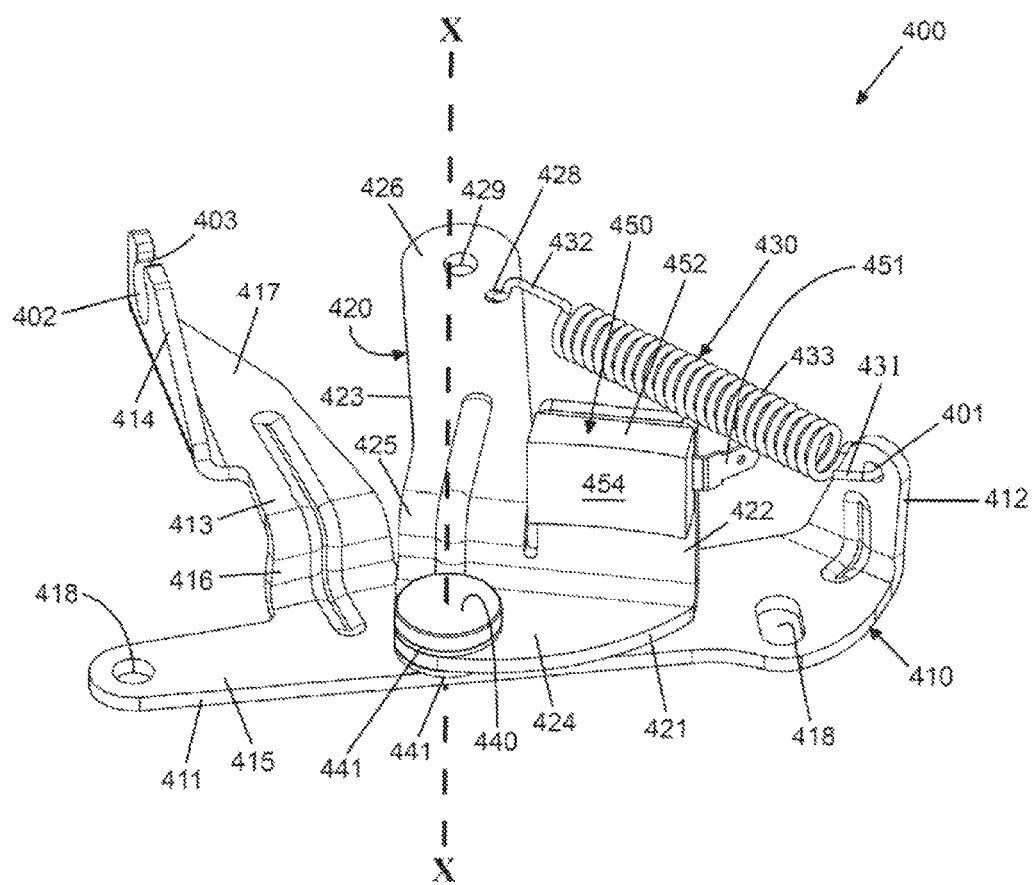
FIG. 4 is an isometric view of the brake assembly of FIG. 3 in an assembled state.

Referring now to FIG. 4, the brake assembly 400 is illustrated in a fully assembled state. When assembled, the brake arm 420 is pivotably mounted to the base plate 410 by the peg member 440 so as to be capable of rotating about axis X-X. The coil spring 430 is connected to the brake arm 420 at end 432 and to the base plate 410 at the other end 431. The coil spring 430 biases the brake arm 420 to pivot clockwise about the axis X-X when the coil spring 430 is stretched out and experiencing a non-zero spring force.

Figure 5:
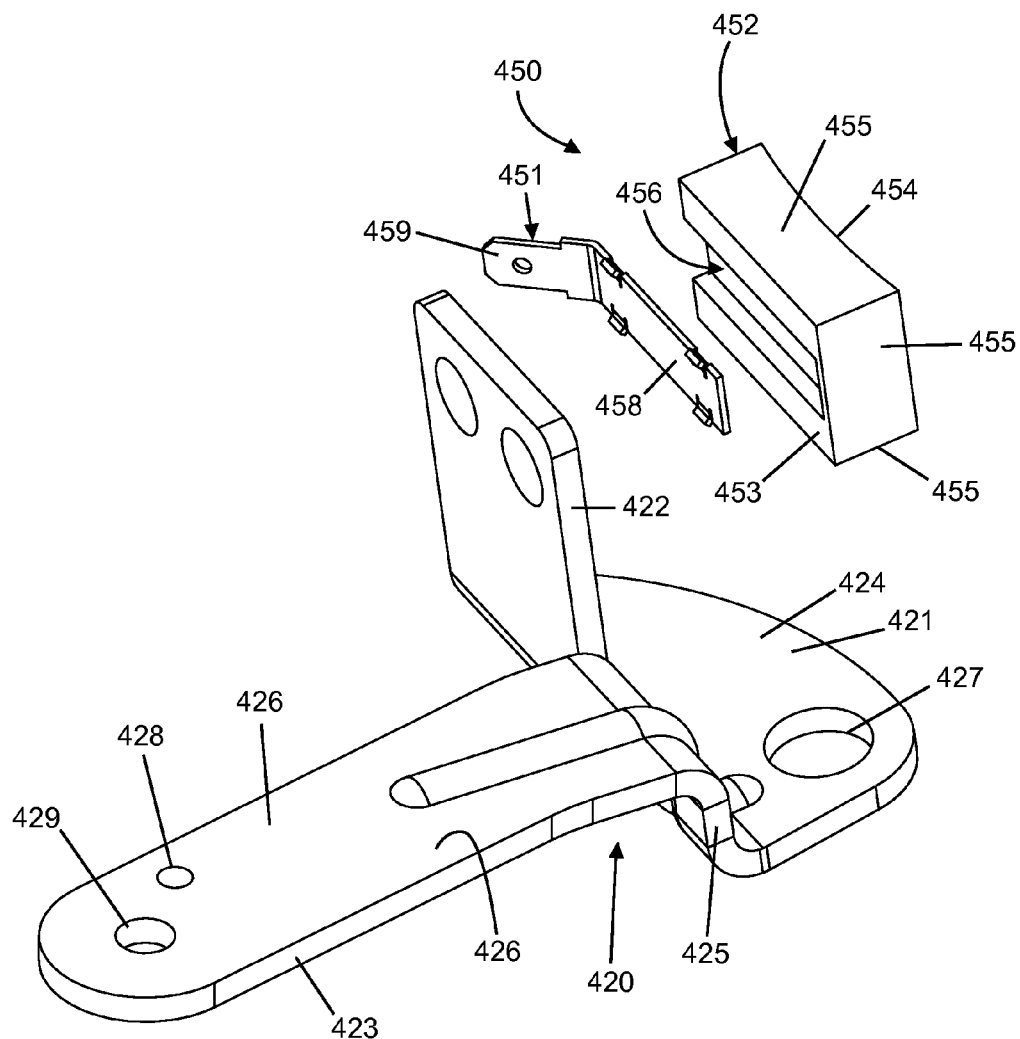
FIG. 5 is an isometric view of the brake arm and the electrically conductive brake pad of the brake assembly of FIG. 3 in an exploded state.
Figure 6:
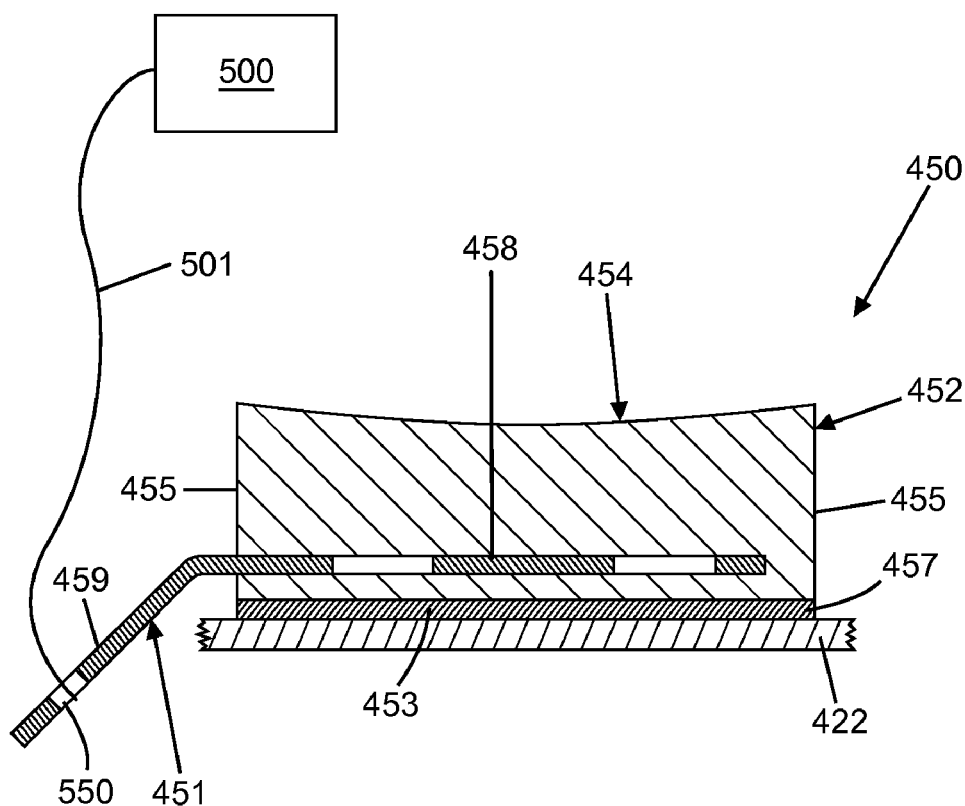
FIG. 6 is a cross-sectional view of the electrically conductive brake pad mounted to the brake arm and operably coupled to the ignition circuit according to an embodiment of the present invention.

Referring now to FIGS. 5 and 6 concurrently, the mounting of the brake pad 450 to the brake arm 420 is described in greater detail. The brake pad 450 comprises a main brake pad body 452 and an electrically conductive terminal 451. The main brake pad body 452 comprises a rear surface 453, a front arcuate working surface 454, and side surfaces 455. The front arcuate working surface 454 is designed for frictional engagement with the outer peripheral edge of the flywheel 210, as with a conventional nonconductive brake pad.

The conductive terminal 451 is constructed of an electrically conductive material, such as copper or other electrically conductive metals. The conductive terminal 451 is secured to the main brake pad body 452 so as to be in electrical communication with the main brake pad body 450. Structurally, a portion 458 of the terminal 451 nests within a groove 456 located on the rear surface 453 of the main brake pad body 452 while an angled portion 459 of the terminal 451 extends from the side surface 455 of the main brake pad body 452. The portion 459 of the terminal 451 extending from the main brake pad body 452 comprises a hole 550 for receiving and electrically connecting an end of the wire 501 of the ignition circuit 500 to the terminal 451. The wire 501 can be electrically connected to the terminal 451 by any means know in the art, including a screw, a compression fitting, soldering, etc. As a result of the aforementioned assembly, the kill lead 503

(FIG. 8) of the ignition circuit 500 is electrically coupled to the main brake pad body 452 (which can then be electrically ground by contact with the flywheel 210).

The brake pad 450 (which includes the main body 452 and terminal 451) is mounted to the brake arm plate 422 of the brake arm 420 so that the brake pad 450 is electrically insulated from the brake arm plate 422 (and thus the brake arm 420). In the exemplified embodiment, this is achieved by using a sufficiently thick layer 457 of non-conductive epoxy to bond the brake pad 450 to the brake arm plate 422. However, the brake pad 450 can be electrically insulated from the brake arm plate 422 in any manner, including without limitation, replacing the epoxy layer 457 with a plastic plate, coating the brake pad plate 422 with a nonconductive material, or the like. Electrically insulating the brake pad 450 from the brake arm 420 prohibits the brake pad 450 from being electrically grounded at all times through contact with the brake arm 420, which may be electrically grounded as a result of its coupling to the chassis. This ensures that the brake pad 450 is only electrically grounded when contacting the flywheel 210 (or other rotating member of the engine 200).

It should be noted that, in some embodiment, the brake pad 450 may not be electrically insulated from the brake arm 420 so long as the brake arm does not serve as an electrical ground. In one such embodiment, the brake arm 420 (or at least the section of the brake arm 420 to which the brake pad 450 mounts) may be constructed of an electrically non-conductive material. In another such embodiment, the brake arm 420 may be electrically connected to the brake pad 450 but electrically insulated from any other structures that may serve as a ground.

Figure 7A:
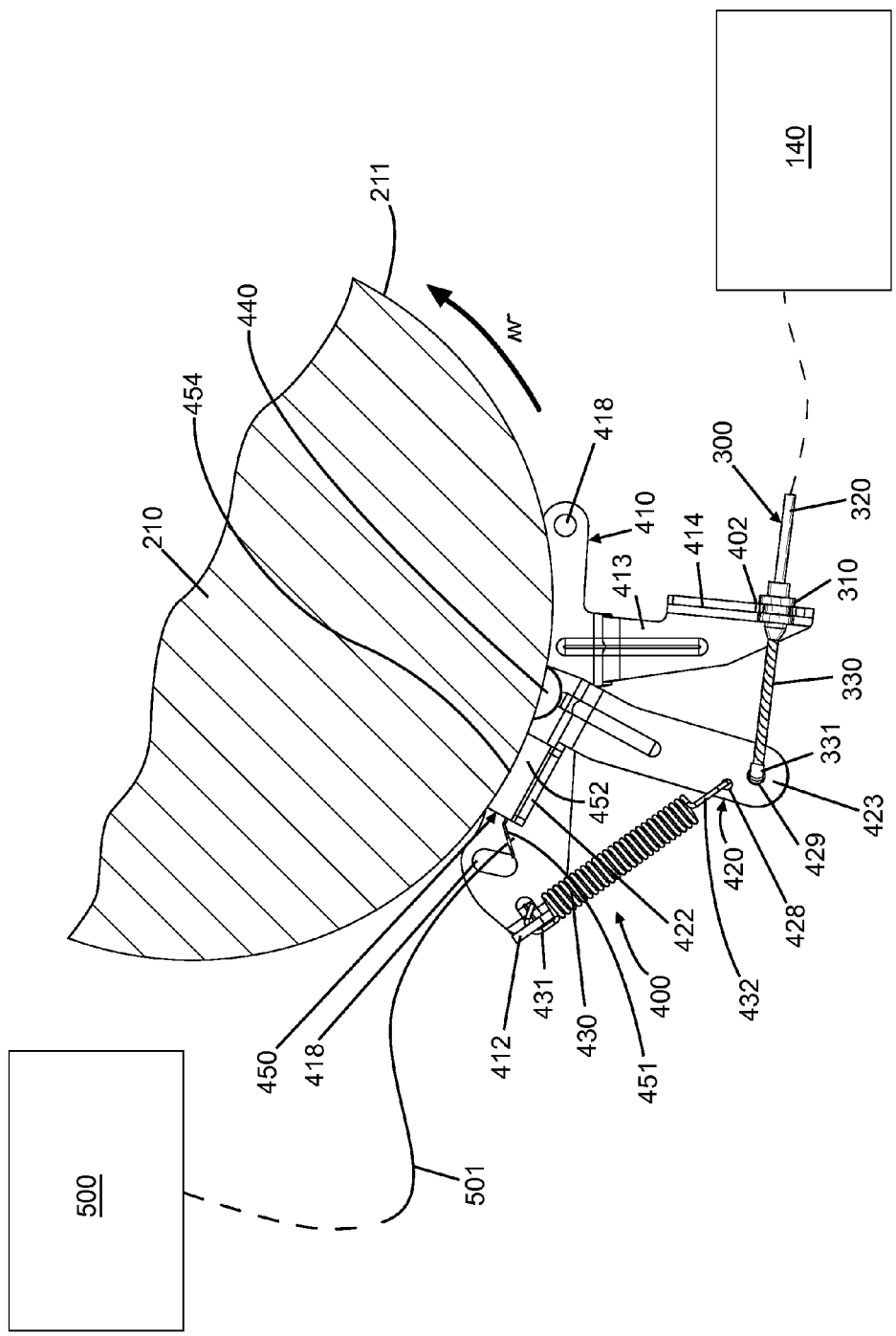
FIG. 7A is a schematic of a brake system incorporating the brake assembly of FIG. 3 according to an embodiment of the present invention, wherein the brake assembly is in a brake position.
Figure 7B:
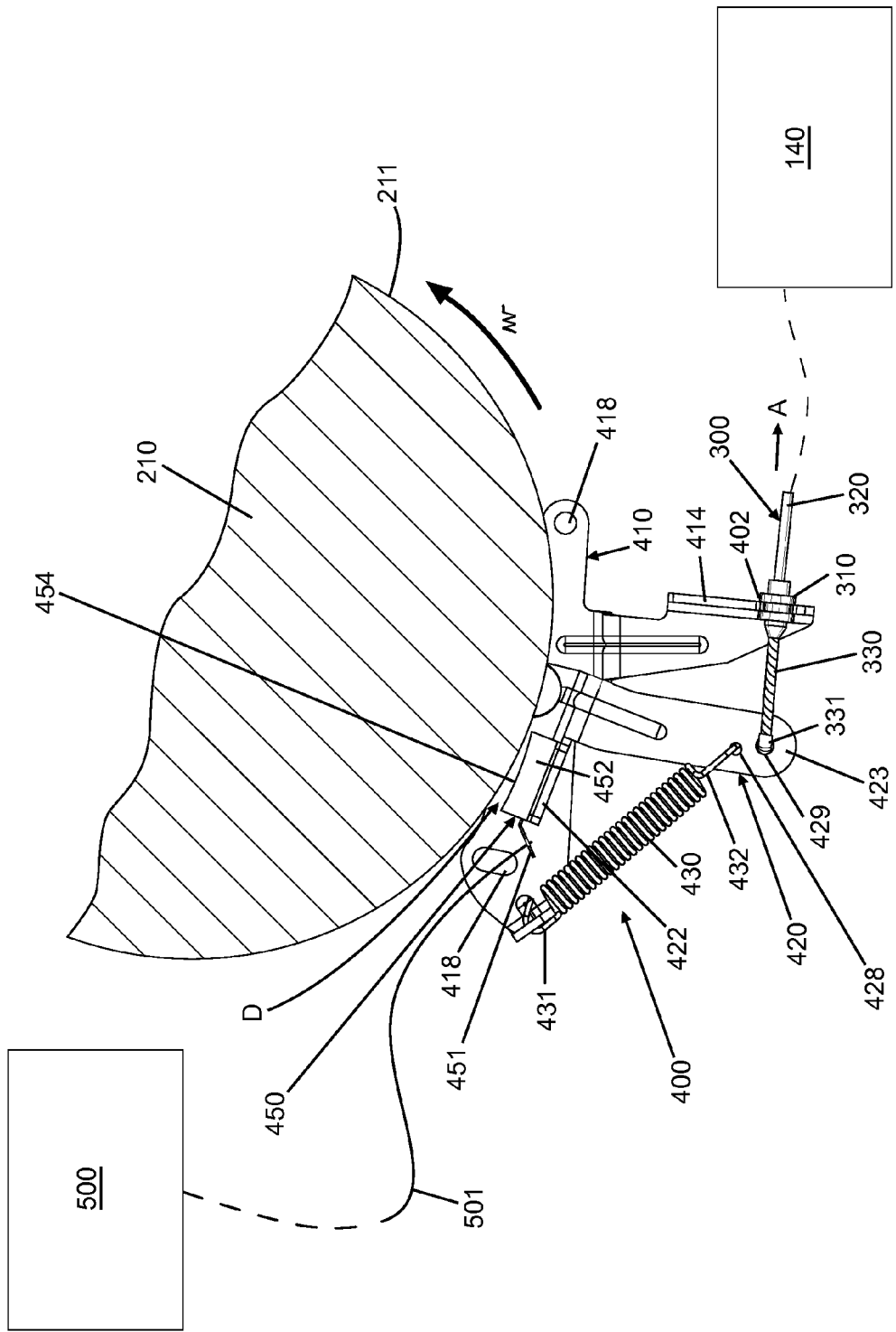
FIG. 7B is a schematic of the brake system of FIG. 7A wherein the brake assembly has been actuated into an operating position.
Figure 9:
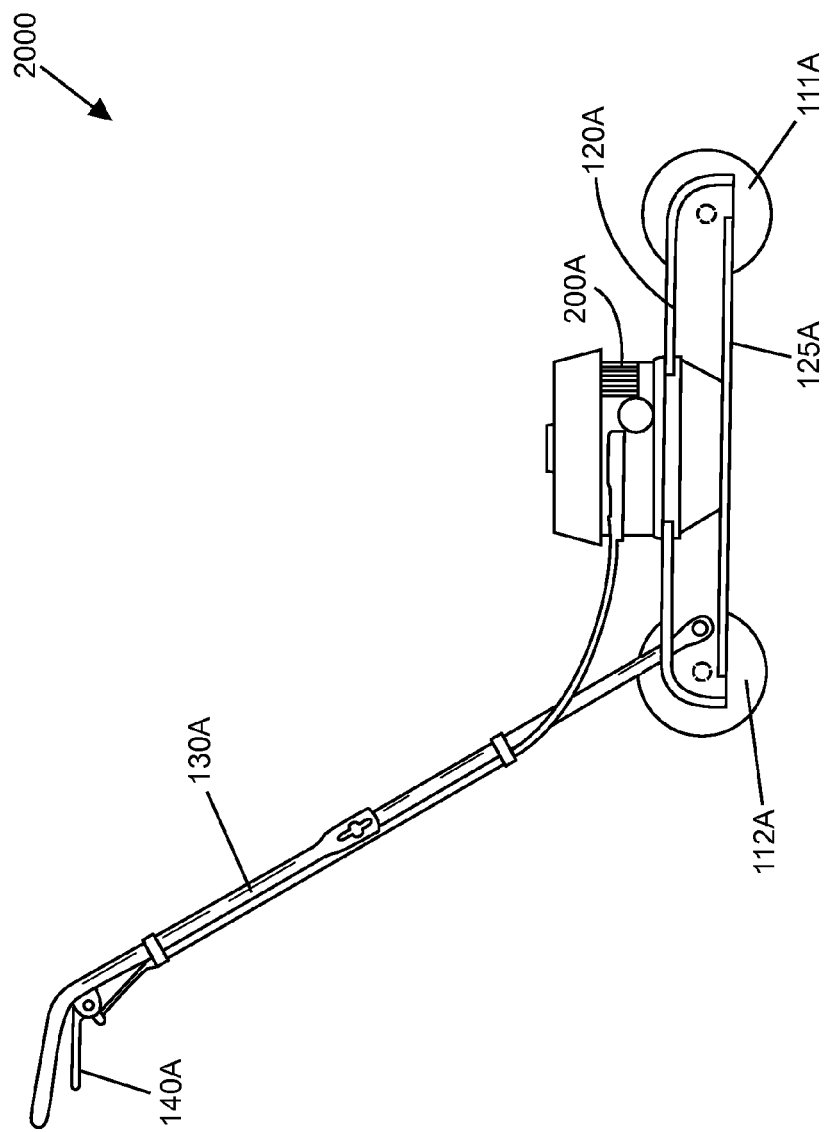
FIG. 9 is a side view of a walk-behind lawn mower according to an embodiment of the present invention.

Referring now to FIGS. 7A and 7B, the structural embodiment of the brake assembly 400 of FIGS. 3-6 is illustrated operationally installed into a powered implement (such as lawn mower 1000 of FIG. 1 or lawn mower 2000 of FIG. 9). The structural arrangement and functioning of the brake assembly 400 within the powered implement will now be described.

Referring to FIG. 7A, the brake assembly 400 is fixedly mounted adjacent the flywheel 210 which is rotationally driven by the engine 200. More specifically, the base plate 410 of the brake assembly 400 is fixedly mounted to the chassis, mower deck or other stable structure of the powered implement by bolting, welding or other connection techniques known in the art. The brake assembly 400 is positioned and oriented during installation so that it is in the brake position (shown in FIG. 7A).

In the brake position, the working surface 454 of the electrically conductive brake pad 450 is in surface contact with the peripheral surface 211 of the flywheel 210, thereby engaging the flywheel 210 and frictionally retarding and/or prohibiting rotation of the flywheel 210. The brake pad 450 is normally biased by the coil spring 430 into the brake position, thereby maintaining or returning the brake pad 450 into contact with the flywheel 210 upon the operator failing to move or maintain the actuator 140 in the actuated position 140. The actuator 140 is in the non-actuated position in FIG. 7A. The normal biasing of the brake pad 450 against the flywheel 210 is achieved by mounting the brake assembly in a position and orientation so that the brake pad 450 is in contact with the flywheel 210 and the coil spring 430 is stretched out in the brake position. Thus, in the brake position, because the exemplified coil spring 430 is an extension spring, the coil spring 430 is under (i.e., exerting) a non-zero spring force due to the loading exerted by the stretched out nature of the coil spring 430. The biasing of the coil spring 430 is always trying to rotate the brake arm 420 clockwise about the peg 440 (i.e., the axis of rotation X-X) so that the brake pad 450 contacts and engages the flywheel 210. However, the contact between the brake pad 450 and the flywheel 210 prohibits the extension coil spring 430 from fully contracting and achieving a zero spring force state.

The contact between the brake pad 450 and the flywheel 210 in the brake position also electrically grounds the kill lead 503 (FIG. 8) of the ignition circuit 500 as the result of the wire 501 being electrically connected to the kill lead 503 at one end and to the conductive terminal 451 at the other end. Thus, in the brake position, the ignition circuit 500 is shorted by the contact between the brake pad 450 and the flywheel 210, thereby rendering the engine 200 inoperative and stopping further rotational driving of the flywheel 210.

The linkage member 300, which is in the form of a flexible cable system, is operably coupled to the brake arm 420 at one end and to the actuator 140 at the other end. In the exemplified embodiment, the linkage member 300 comprises a grommet 310, a sheath 320 connected to the grommet 310, and a cable 330 disposed within and extending from the sheath 320. The grommet 310 is fixedly mounted within the open perimeter hole 402 of the grommet mounting plate 414 of the base plate 410. The cable 330 extends from the grommet 310 and has a first end 331 connected to the linkage hole 429 of the arm plate 423 of the brake arm 420. The other end of the cable 330 is operably coupled to the actuator 140.

Referring now to FIG. 7B, the brake assembly 400 is in the operating position. The brake assembly 400 is moved from the brake position to the operating position by the operator moving the actuator 140 from the non-actuated position to the actuated position. Depending on the type of actuator used, movement of the actuator 140 from the non-actuated position to the actuated position may be accomplished by sitting in a seat, rotating a lever, depressing a button, flipping a switch, translating a plunger, turning a knob, etc.

In the exemplified embodiment, movement of the actuator 140 into the actuated position pulls the cable 330 in a direction indicated by arrow A. As a result of this movement and the cable's 330 connection to the brake arm 420, the cable 330 rotates the brake arm 420 counter clockwise against the biasing force of the coil spring 430, thereby causing the brake pad 450 to disengage and move out of contact with the flywheel 210 (i.e., into the operating position). In the operating position, the brake pad 450 is spaced apart from the flywheel 210 by a distance D and is in an electrically non-grounded state (by nature of its electrical insulation from the brake arm 420). The disengagement of the brake pad 450 from the flywheel 210 in the operating position allows the flywheel 210 to rotate unimpeded by the brake pad 450 when driven by the engine 200. Furthermore, the electrically non-grounded state of the brake pad 450 in the operating position allows the ignition circuit 500 to fire the spark plug 502 (FIG. 8), thereby rendering the engine 200 fully operative.

Upon the operator failing to provide adequate force to the actuator 140 to maintain the actuator 140 in the actuated position, the bias of the coil spring 430 automatically moves the brake pad 450 back into contact and engagement with the flywheel 210 (i.e., the brake position). By nature of its connection to the brake arm 420, the cable 330 also moves in a direction opposite of arrow A. The actuator 140 is also moved back into the non-actuated position either by a separate resilient member or the force of the coil spring 430.

By designing the inventive brake system so that contact between the electrically conductive brake pad 450 and the flywheel 210 renders the engine inoperative, the distance which the brake arm 420 must move is significantly reduced, as compared to existing brake systems. Thus, the invention affords shorter and more accurate brake travel. Moreover, because the engine is rendered inoperative by grounding a conductive member against a rotating member, the possibility of debris or other contaminants prohibiting the electrical grounding of the kill lead may be reduced.

Referring now to FIG. 8, an electrical schematic of one possible ignition circuit 500 is illustrated. Of course, the use of a wide variety of ignition circuit types and layouts are contemplated by the present invention. The exemplified ignition circuit 500 is specifically designed to be used in conjunction with a flywheel having magnets that induce voltages in coils 505 and 507. As can be seen by the diagram, the electrically conductive brake pad 450 is, in essence, a switch in which the main brake pad body 452 and the flywheel 210 form the switch terminals. The switch is "open" when the main brake pad body 452 is not in contact with the flywheel 210 (i.e., is in the operating position) and is "closed" when the main brake pad body 452 is in contact with the flywheel 210 (i.e., is in the brake position). Current induced in the coil 505 is supplied by way of a diode 509 to charge a capacitor 511 so long as the switch formed by the brake pad 450 and the flywheel 210 is open. This switch is open only when the brake system is in the operating position illustrated in FIG. 7B. Voltages induced in the coil 507 trigger silicon controlled rectifier 513 to discharge the charge accumulated on capacitor 511 through a primary winding 515, inducing a high voltage in secondary winding 517 to be supplied to the sparkplug 502. Closing the switch formed by the brake pad 450 and the flywheel 210 will preclude the accumulation of any charge on capacitor 511 and therefore disable the ignition system when the brake system is in the brake position illustrated in FIG. 7A.

Referring now to FIG. 9, another embodiment of a lawn mower 2000 that can include the inventive brake system is illustrated. The lawn mower 2000 is an ambulatory style lawn mower and generally includes a chassis, front wheels 111A and rear wheels 112A supporting the chassis, a mower deck 120A supported by the chassis, an engine 200A (schematically illustrated in FIGS. 10A-10B) supported by the chassis, a cutting implement 125A (schematically illustrated in FIGS. 10A-10B) disposed beneath the mower deck 120A and rotationally driven by the engine 200A, a handle 130A, and a lever 140A pivotably connected to the handle 130A.

Figure 10A:
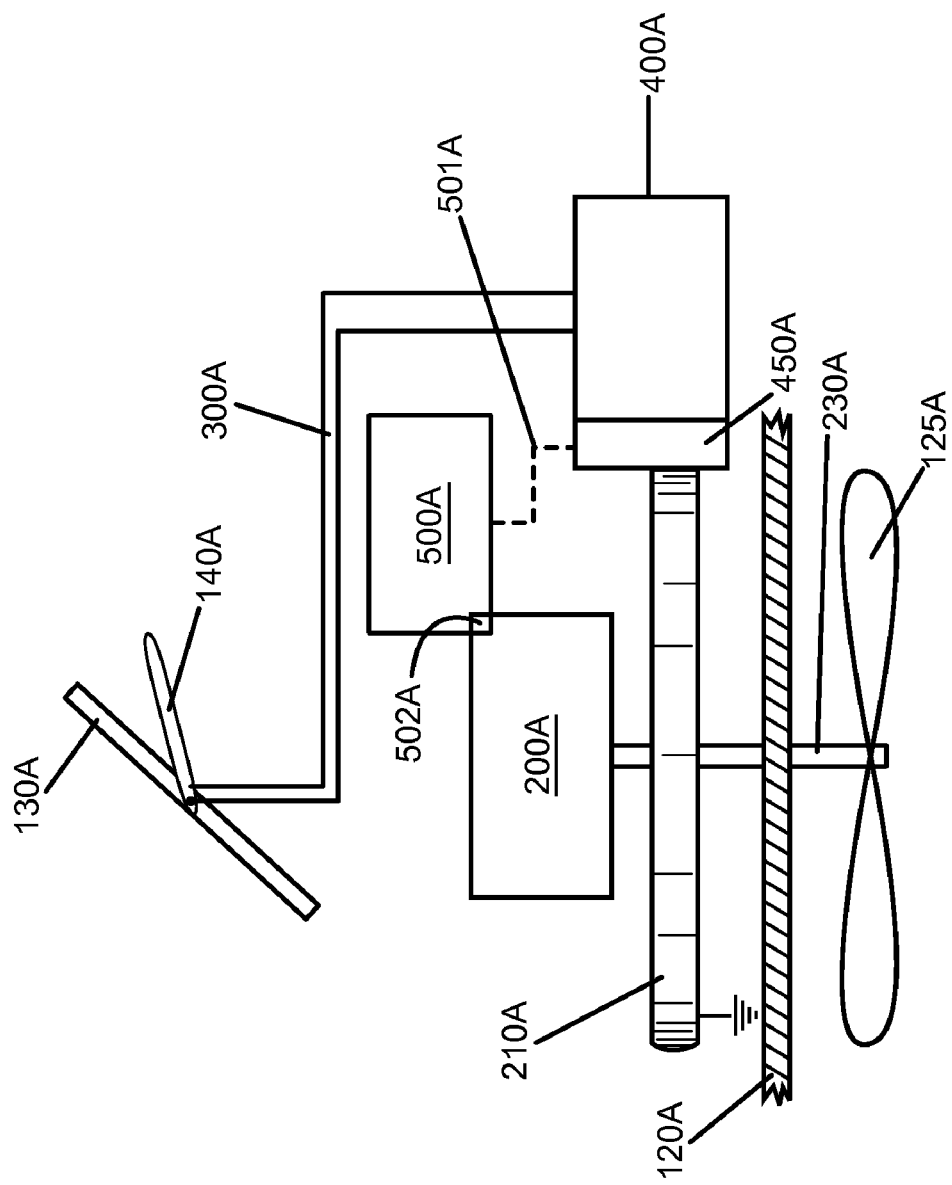
FIG. 10A is an electromechanical schematic of the braking system of the walk-behind lawn mower of FIG. 9 according to an embodiment of the present invention, wherein the braking system is in a brake position.
Figure 10B:
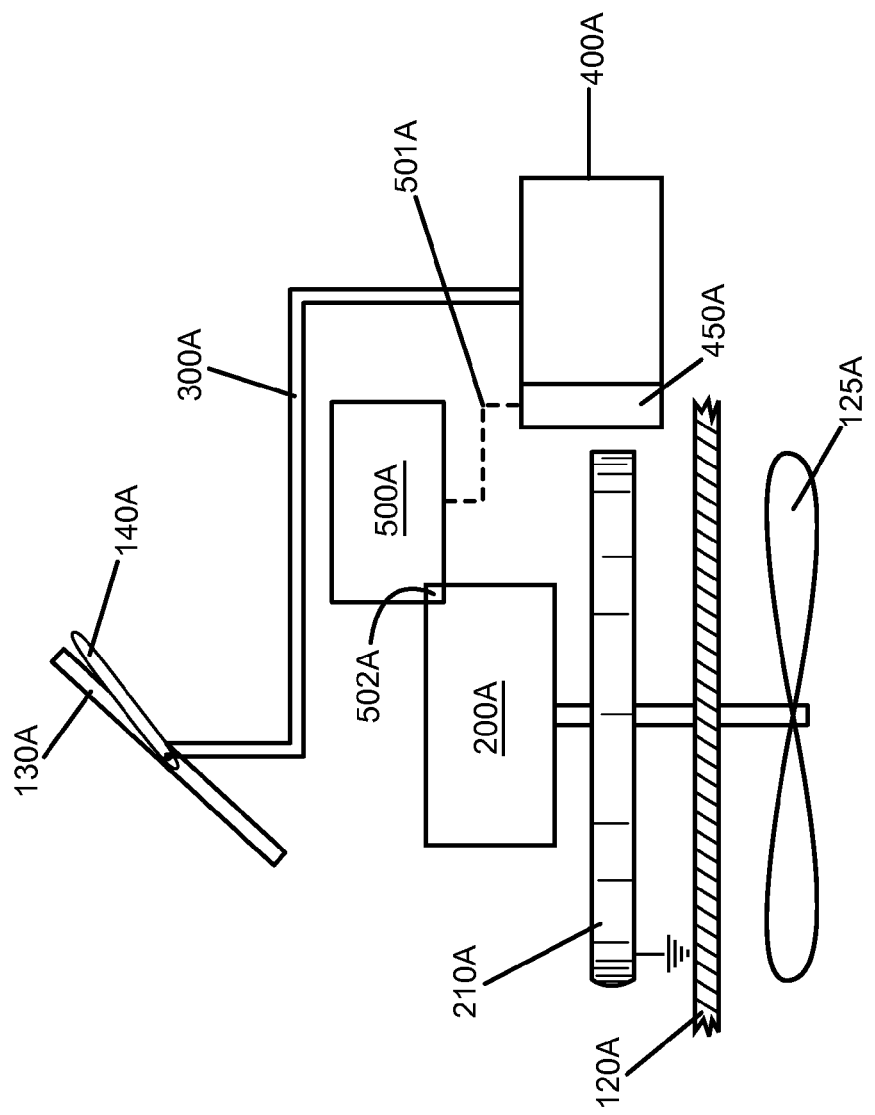
FIG. 10B is an electromechanical schematic of the braking system of FIG. 10A, wherein the braking system has been actuated into an operating position.

Referring now to FIGS. 10A and 10B concurrently, the inventive brake system is illustrated incorporated into the lawn mower 2000 of FIG. 9. As will be noted, the incorporation of the inventive brake system and its functioning within the lawn mower 2000 is very similar to its incorporation and functioning within the lawn mower 1000 of FIG. 1, as was illustrated in FIGS. 2A and 2B and described in detail above. In order to avoid redundancy, a detailed discussion of the operation and system shown in FIGS. 10A and 10B will be omitted. For reference and understanding, the numbers used to identify the components of the lawn mower 2000 are identical to those used to describe lawn mower 1000 with the exception of the alphabetical suffix "A" being added.

The primary differences between the lawn mower 2000 and the lawn mower 1000 is that the cutting implement 125A is connected directly to the crankshaft 230A rather than being operably coupled via a belt system. Additionally, the actuator is in the form of a lever 140A that is pivotably mounted to the handle 130A rather than a seat. In FIG. 10A, the brake assembly 140A is in the brake position and the actuator/lever 140A is in a non-actuated position. In FIG. 10B, the brake assembly 140A is in the operating position and the actuator/lever 140A is in an actuated position. The actuator/lever is moved from the non-actuated position to the actuated position by the operator depressing the actuator/lever 140A against the handle 130A during use. This actuation of the actuator/lever 140A moves the brake assembly 400A from the brake position to the operating position.

While the invention has been described and illustrated in detail, various alternatives and modifications will become readily apparent to those skilled in the art without departing from the spirit and scope of the invention.

What is claimed is:

1. A powered implement having an engine comprising:
    a rotating member rotated by the engine, the rotating member being electrically ground;
    an ignition circuit that powers the engine, the ignition circuit operably coupled to a conductive member that renders the engine inoperative when electrically grounded;
    a brake system comprising an actuator, the conductive member normally biased into a brake position in which the conductive member contacts the rotating member and is electrically grounded as a result of the contact with the rotating member; and
    the actuator operably coupled to the conductive member so that actuation of the actuator moves the conductive member from the brake position to an operating position in which the conductive member is spaced-apart from the rotating member and is in an electrically non-grounded state.

2. The powered implement of claim 1, wherein the rotating member is a flywheel.

3. The powered implement of claim 1, wherein the conductive member is an electrically conductive brake pad and the contact in the brake position is achieved by surface contact between a working surface of the brake pad and a surface of the rotating member.

4. The powered implement of claim 3, wherein the brake pad comprises a conductive terminal extending from the brake pad, the ignition circuit comprising an electrical wire operably coupled to the conductive terminal.

5. The powered implement of claim 1 wherein the conductive member is an electrically conductive brake pad, and wherein the brake system further comprises a pivotable brake arm, the brake pad mounted to and electrically insulated from the brake arm.

6. The powered implement of claim 1, wherein the brake system further comprises a resilient member operably coupled to the conductive member, the resilient member biasing the conductive member into the brake position and being under a non-zero spring force when the conductive member is in the brake position.

7. The powered implement of claim 1, wherein the actuator is selected from a group consisting of a lever, a pedal and a seat.

8. The powered implement of claim 1, wherein the powered implement is a lawn mower.

9. The powered implement of claim 1, further comprising:
    the conductive member being an electrically conductive brake pad comprising a conductive terminal;
    the ignition circuit comprising an electrical wire operably coupled to the conductive terminal;
    the brake system further comprising a brake arm, a resilient member, a brake plate, and a linkage member;
    the brake pad mounted to and electrically insulated from the brake arm;
    the brake plate fixedly mounted adjacent the rotating member, the brake arm pivotably mounted to the brake plate so as to be pivotable between the brake position and the operating position;

the resilient member having a first end connected to the brake arm and a second end connected to the brake plate, the resilient member biasing the brake arm into the brake position, the resilient member being under a non-zero spring force in the brake position;

the linkage member having a first end connected to the actuator and a second end connected to the brake arm; and wherein the brake pad is constructed of a resin composite material containing interlocking metal fibers.

10. The powered implement of claim 1, wherein the conductive member is electrically coupled to the ignition circuit in both the brake position and the operating position.

11. A system for stopping an electrically grounded rotating member of an engine powered by an ignition circuit, the system comprising:

a conductive member operably coupled to the ignition circuit that renders the engine inoperative when electrically grounded, the conductive member mounted adjacent the rotating member;

the conductive member normally biased into a brake position in which the conductive member contacts the rotating member and is electrically grounded as a result of the contact with the rotating member; and wherein the conductive member is in an electrically non-grounded state when not in contact with the rotating member.

12. The system of claim 11, further comprising an actuator operably coupled to the conductive member so that user applied force to the actuator moves the conductive member from the brake position to an operating position in which the conductive member is spaced-apart from the rotating member and is in the electrically non-grounded state.

13. The system of claim 11, wherein the rotating member is a flywheel.

14. The system of claim 11, wherein the conductive member is an electrically conductive brake pad and the contact in the brake position is achieved by surface contact between a working surface of the brake pad and a surface of the rotating member.

15. The system of claim 11, further comprising a pivotable brake arm and wherein the conductive member is an electrically conductive brake pad, the brake pad mounted to and electrically insulated from the brake arm.

16. The system of claim 11, further comprising:

the conductive member being an electrically conductive brake pad comprising a conductive terminal;

the ignition circuit comprising an electrical wire operably coupled to the conductive terminal;

the brake assembly further comprising a brake arm, a resilient member, a brake plate, and a linkage member;

the brake pad mounted to and electrically insulated from the brake arm;

the brake plate fixedly mounted adjacent the rotating member, the brake arm pivotably mounted to the brake plate so as to be pivotable between the brake position and the operating position;

the resilient member having a first end connected to the brake arm and a second end connected to the brake plate, the resilient member biasing the brake arm into the brake position, the resilient member being under a non-zero spring force in the brake position;

the linkage member having a first end connected to the actuator and a second end connected to the brake arm; and wherein the electrically conductive brake pad is constructed of a resin composite material containing interlocking metal fibers.

17. A brake system for stopping an electrically grounded rotating member of an engine powered by an ignition circuit, the brake system comprising:

an electrically conductive brake pad operably coupled to the ignition circuit that renders the engine inoperative when electrically grounded; and wherein the electrically conductive brake pad is electrically coupled to the ignition circuit when the engine is inoperative and when the engine is operative.

18. The brake system of claim 17, further comprising a brake arm, the brake pad mounted to and electrically insulated from the brake arm.

19. The brake system of claim 17, wherein the brake pad comprises a conductive terminal extending from the brake pad and is constructed of a resin composite material containing interlocking metal fibers.

20. The brake system of claim 17, further comprising a resilient member operably coupled to the brake pad, the resilient member biasing the brake pad into the brake position and being under a non-zero spring force when the brake pad is in the brake position.

21. The brake system of claim 17, further comprising:

wherein the brake pad comprises a conductive terminal extending from the brake pad;

an electrical wire having a first end operably coupled to the conductive terminal and a second end operably coupled to the ignition circuit a brake arm, a resilient member, a brake plate, an actuator, and a linkage member;

the brake pad mounted to and electrically insulated from the brake arm;

the brake plate fixedly mounted adjacent the rotating member, the brake arm pivotably mounted to the brake plate;

the resilient member having a first end connected to the brake arm and a second end connected to the brake plate, the resilient member biasing the brake arm into the brake position, the resilient member being under a non-zero spring force in the brake position;

the linkage member having a first end connected to the actuator and a second end connected to the brake arm; and wherein actuation of the actuator overcomes the non-zero spring force and moves the brake pad to be spaced apart from the rotating member and in an electrically non-grounded state.

22. A brake system for stopping an electrically grounded rotating member of an engine powered by an ignition circuit, the brake system comprising:

an electrically conductive brake member movable between: (1) a brake position in which the electrically conductive brake member contacts the electrically grounded rotating member; and (2) an operating position in which the electrically conductive brake member is in an electrically non-grounded state;

the electrically conductive brake member operably coupled to the ignition circuit to render the engine inoperative when electrically grounded; and wherein the electrically conductive brake member is electrically coupled to the ignition circuit in both the brake position and the operating position.

* * * * *